May 9, 1967  AKIRA FUJIMAKI  3,318,773
METHOD OF PRODUCING GLYCYRRHIZIN DERIVATIVE
Filed Sept. 23, 1963

INVENTOR.
AKIRA FUJIMAKI
BY
Nolte & Nolte
ATTORNEYS

United States Patent Office 3,318,773
Patented May 9, 1967

3,318,773
METHOD OF PRODUCING GLYCYRRHIZIN DERIVATIVE
Akira Fujimaki, 957–7 3-chome, Nukuitkitamachi, Koganei-shi, Tokyo-to, Japan
Filed Sept. 23, 1963, Ser. No. 310,946
Claims priority, application Japan, Sept. 27, 1962, 37/42,300
8 Claims. (Cl. 167—67)

The present invention relates to the process of producing a new active substance wherein the substance which exhibits the maximum absorption at 259 m. of ultraviolet light is obtained by separating and purifying the extracted liquid of microbes, algae or other plants containing that substance, and which indicates positive for sedimentation reaction of protein reagent and ninhydrin dyed image closer to the cathode than lysine and has a maximum absorption near 259 m. of ultraviolet.

The characteristics and advantages of the present invention will be clear in the following descriptions.

Mono-cellular algae such as Chlorellascenedesmus are lower order plants in their constitution; but their biological value surpass that of higher order plants.

While some higher order plants contain certain alkaloids, there are no such compounds in Chlorella. This substance has been ignored for a long time, considering the origin and the evolution of life. Since about 1930, however, scientists have been working on fundamental study on the subject, and have shown a remarkable progress in these 10 years. Studies on the mechanism of photo-synthesis played by Chlorella, its masssculture, and the use of the high biological value of Chlorella—are a part of the progress.

The instant applicant has studied in this field, particularly with respect to the remarkable multiplication rate and biological value of Chlorella.

After a series of experiments about the relation between the cell-division of Chlorella and SH group of solution and other various substances, applicant ascertained that there was some correlation between the SH group of solution and other substances in the cell of Chlorella, and discovered a new active substance which was very useful for human and other living bodies, and succeeded in the purification and production of this substance.

Figure 1:
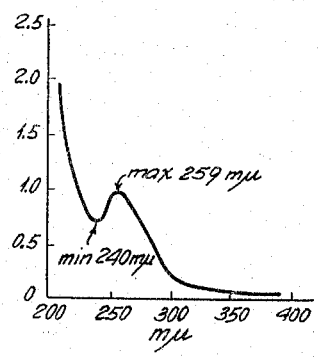
Figure 2:
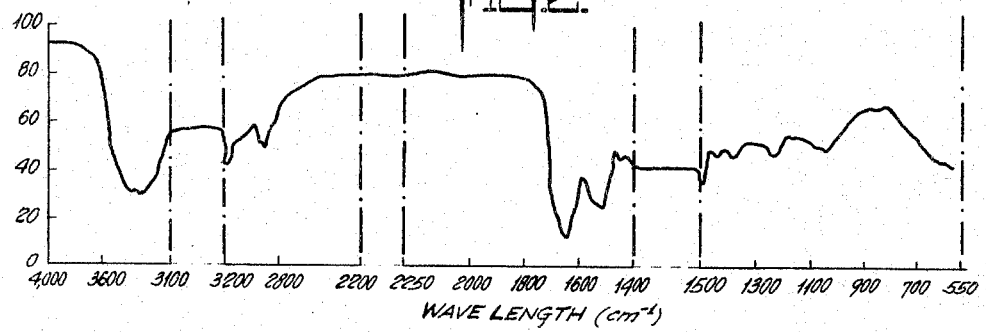
Figure 3:
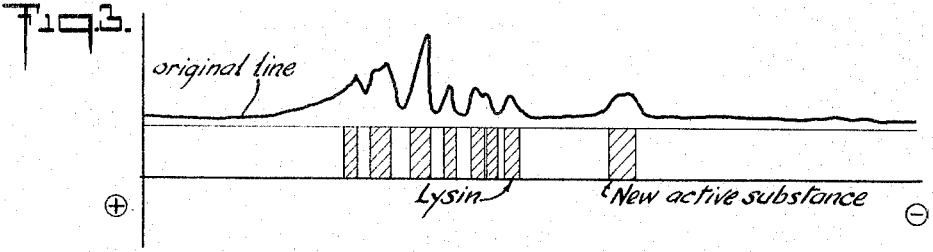

FIG. 1 is the absorption spectrum of ultraviolet rays by the new active substance obtained from Chlorella by the process of this invention. FIG. 2 is the infrared absorption spectrum of the substance. FIG. 3 is the pattern of transmission of the ninhydrin dyed image which is obtained by analysing the extracted liquid of Chlorella onto the paper-electrophoresis.

Figure 4:
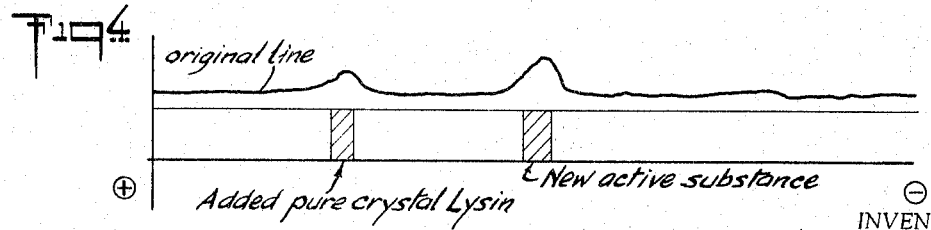

FIG. 4 is the similar pattern of transmission as FIG. 3, wherein the paper-electrophoresis is taken with the solution of the new active substance under addition of lysine.

Explanation of the invention will be given with a series of experiments.

(1) *Dissolving test of Chlorella.*—The cell-walls of Chlorella are comparatively strong, but when they are fused after being frozen by Dry-Ice-acetone, the substance in the cell is easily dissolved. Or the cell-walls are easily destroyed and the substance in the cell is dis- Table A

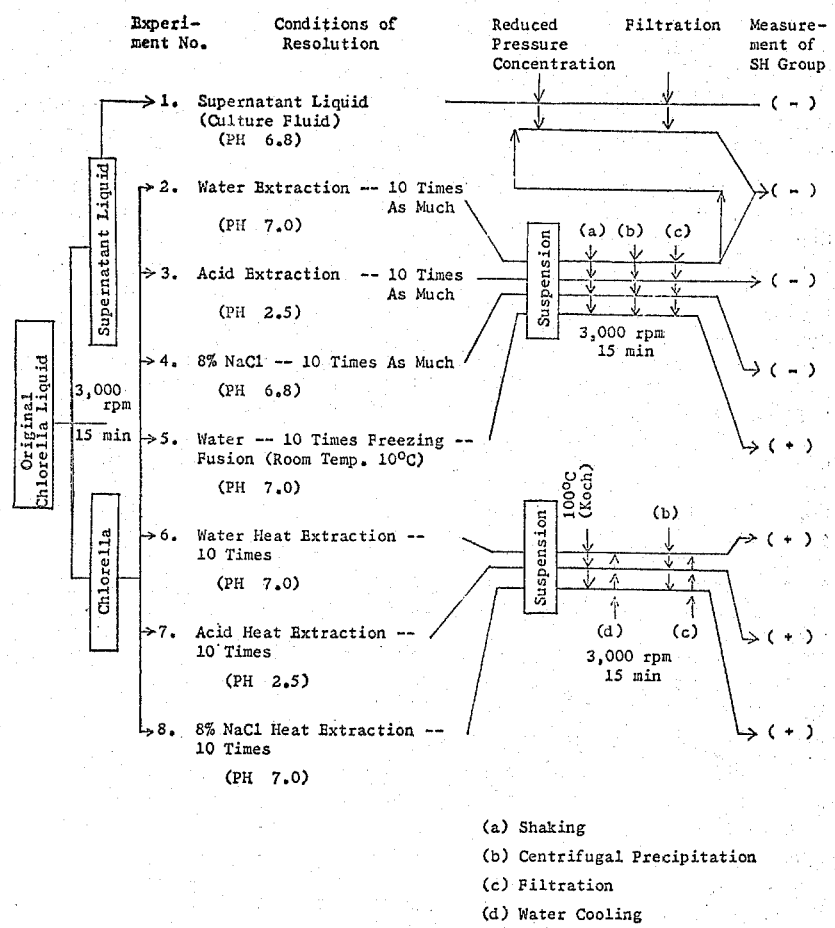

(a) Shaking
(b) Centrifugal Precipitation
(c) Filtration
(d) Water Cooling solved when boiled and extracted in the hot water.

As the result of this dissolving test, it is known that the dissolving power is greater in the latter case than in the former.

Table A shows the quantity of SH-group obtained by the extraction process of Chlorella.

The algae of Chlorella taken out from the culture pond is centrifuged at 4,000 r.p.m. for 30 minutes—until its moisture content is 78%, then is dissolved under various conditions. The following Table B shows the result of the repeated extraction at 100° C. and 60° C. of dissolving temperature, indicating the value of SH group as a index.

Table B

| | Conditions of Extraction/Time of Extraction | | | |
|---|---|---|---|---|
| | 100° C., 10 min. | | 60° C., 10 min. | |
| | GSH, mg./ CHLO dry, 100 g. | Extraction Percentage | GSH, mg./ CHLO dry, 100 g. | Extraction Percentage |
| 1 | 231.9 | 94.0 | 158.2 | 78.1 |
| 2 | 14.8 | 6.0 | 29.5 | 14.6 |
| 3 | 0 | 0 | 04.8 | 7.3 |
| Total | 246.7 | 100 | 202.5 | 100 |

NOTE.—GSH = Glutathione; CHLO = Chlorella.

The reason why SH group was used as an index is due to the fact that the instant applicant has observed that some proportional relation exists between the SH group and the new active substance to be obtained. Thus, though there may be some structural difference in the sample (various living cells are used), the existence of some available active substance which affect the multiplication of cells has something to do with SH group.

(2) *Estimation of SH group.*—For the estimation of SH group, the highly reliable Amperometric titration is used. The principle is that the SH group consumes $Ag(NH_3)_2^+$ in the following reaction, when titrated with silver nitrate in the ammonia supporting electrolyte solution of the sample.

$$RSH + Ag(NH_3)_2^+ = RSAg + NH_4^+ + NH_3$$

The end point of the titration is to be determined by plotting the graph of current meter reading versus the quantity of titration of silver nitrate, because the electrolytic pressure for $Ag(NH_3)_2^+$ is kept on $HgI_2$ electrode as the excess silver nitrate $Ag(NH_3)_2^+$ to increase limiting diffusion current.

(3) *On the composition analysed by the paper-electrophoresis.*—Various substance dissolved from Chlorella cells are the mixture of amino acids, vitamins, etc.

According to the method of paper-electrophoresis the extracted solution is dissolved in hexane, and the filter paper( Whatman No. 1 5 cm. width) is immersed in the buffer solution of pH 1.5 consisting of formic acid, glacial acetic acid, and water (5:15:80).

Then remove the surplus buffer solution by holding the filter paper between two other clear sheets of paper. Next drip the sample solution on points 8 cm. from the anode.

After both ends of fixed filter paper are immersed in the buffer solution, electrophoresis for 20 minutes at 5,000 volts takes place, and next the paper is dried by air, the filter colored with 0.2% acetone solution of ninhydrin and fixed with paraffin.

The absorption is then measured, and FIG. 3 shows the composition of the substance. Thus, one knows each amino acid and other substance by comparing the ninhydrin dyed image with that of crystal pure amino acids.

If the $R_f$ of lysine on the ninhydrin dyed image is 1, the spots of dyed image nearer to the cathode than lysine are known to be mainly various amino acids. Applicant attempted to identify this unknown spot, and as a result, could find that the substance producing this spot separated from an extracted solution of Chlorella in combination with various salts of glycyrrhizin or glycyrrhizinic acid (to be called GL hereinafter) at a pH of solution of less than 4.5 (preferably less than 4.0).

The formula of glycyrrhizin is $C_{42}H_{62}O_{16}$ and its molecular weight is 822.92, and as insoluble in water, it is used in the form of Na, K, Ca or $NH_3$ salts which are water soluble.

GL was separated from the precipitated substance and the pH adjusted to 7.0, then analysed again by paper-electrophoresis. FIG. 4 shows the ninhydrin dyed image. As shown in the figure, the image of this substance is a belt on the side nearer to the cathode than lysine, and it is clear that amino acids are not contained.

The new substance thus isolated shows the maximum absorption of ultra-violet ray near 259 m. in its 0.05% aqueous solution at pH 6.5, while its infrared absorption spectrum is such as is shown in FIG. 2. The substance, even when it is not separated but in combination with GL, is harmless to human bodies and can be used as it is.

Though the use of GL is the best way to produce the said substance, other methods such as by chromato column or ion exchange column are also available. Or, the GL method may be applied on the concentrated liquid of these methods.

The fact that the desired substance can be effectively precipitated by addition of GL salt at the pH less than 4.0, shows that this isolation process is a new method and generally applicable also on the extracted liquid of microbes such as Chlorellascenedesmus and other plants.

The separation of GL from the precipitated substance is easily performed by treating it in 85–95% alcohol solution.

The said substance can be used for nutritional and cosmetic purposes.

The reactivity of the said active substance produced from Chlorella by the process of the present invention against the various protein reagents is as follows.

(1) Color reaction:
  Ninhydrin reaction (+)
  Biuret reaction (+)
  Millon's reaction (+)
  Hopkinscole reaction (+)
(2) Precipitation reaction:
  Alcohol (+)
  Trichloracetic acid (+)
  Sulfosalicylic acid (+)

Thus, the said substance is assumed to be essentially a basic polypeptide. This assumption is also confirmed by the fact that the substance yields various amino acids when digested and decomposed.

Next, the anafraxi test was carried out on this substance; 1 cc. of aqueous solution of the substance (0.25% pH 6.5) was injected every day under the skin of each of 10 mormots, the weight of each mormot was 300–350 grams, sensitizing them to the substance, and three weeks after this period, 0.2 cc. was injected in the vein as a provocative injection, but there was no abnormal state observed. Therefore, a clinical test was performed, wherein 2 cc. of an injection containing 5 mg. of the substance was used, and as the result that the promotion of appetite, and the recovery from fatigue was proved.

It should be noted that the substance is also contained in microbes and other plants besides the unicellular algae such as the said Chlorellascendesmus and has the relation with SH group, and that it is also produced from them in a similar way. If an SH compound of these plants is calculated as GSH and expressed in figures, the result is as follows.

Materials: GSH mg./dry 100 g.
- Chlorella _____ 775.00
- Lotus seed _____ 341.70
- Onion (immediately after harvest while still growing) _____ 45.40
- Bamboo shoot (immediately after harvest while still growing) _____ 263.20
- Wild rocambole (immediately after harvest while still growing) _____ 11.27

As is shown in the above table, Chlorella is the most convenient material from which this substance should be produced, though it is contained also in other materials.

Next, several examples of the present invention will be shown.

*Example 1*

Fresh algae of Chlorella is separated from the culture liquid by centrifuge. The precipiated algae is again suspended and the centrifugal separation repeated. Then water is added to 100 grams of algae (water content 78%) so that the total volume is 1,000 ml., the pH is adjusted to 6.8–7.0 by N/NaOH and the liquid is heated for 10 minutes in a boiling water bath. The algae is separated by centrifuge after cooling, 900 cc. supernatant liquid of light yellowish green color are obtained.

This process may be repeated with fresh water, if necessary, thus the hot water extracted liquid of Chlorella may be obtained. The color of the liquid becomes milky yellowish white when the pH of the liquid is adjusted to 4.0 by N/HCl, and a large amount of precipitate is formed. These precipitated substance are separated by centrifuge either immediately or after being heated, coagulated and cooled, thus, supernatant liquid of milky yellowish white color is obtained. 2% NaOH salt solution of pure crystal GL (glycyrrhizin) is put into a 50 ml. burette and dripped into the said liquid, and 10 ml. is necessary for the performance of the separating reaction. The amount of the GL solution consumed here is in proportion to the amount of the available active substance contained. The end point of dripping GL solution is decided when there is no more precipitation in sight. Then, the liquid is heated up to 70° C. and water cooled, and separated into the supernatant yellowish top liquid and the milky yellowish precipitate. The separated precipitate is washed with fresh water (pH is less than 4.0 with HCl) and a white precipitate is obtained.

Next absolute ethanol or absolute methanol is added to these precipitates and washed by shaking repeatedly until the color of the alcoholic solution is lost. The concentration of the alcohol is desirably 90% (95–85%). Here, GL and a little of chlorophyll and others are transmitted to alcohol.

White precipitate thus obtained is washed with alcohol and ether and dried under decreased pressure, finally 800 mg. of white powder is obtained.

The residue separated by heat extraction is treated with dilute HCl (pH is less than 4.0), it is possible to obtain the small amount of the available substance remaining when the method of GL reaction is applied.

*Example 2*

0.3% phenol solution is added to 100 gr. fresh Chlorella obtained by centrifugal precipitation and washing in a similar way as described in Example 1, so that the total volume is 1,000 ml., next the pH of the liquid is kept at 6.8 by N/NaOH and the liquid is heated at 100° C. for 10 minutes. The liquid is divided into the top liquid and precipitated residue by centrifuge after water cooling.

The hot-extracted solution is treated in the same way as in Example 1 and the precipitate is rejected by keeping the pH of solution at 4.0. Next, a proper quantity of GL-ammonia solution is added to this clear liquid, so that the compound of the expected substance and GL is precipitated as in Example 1. Then this separated precipitate is suspended in 100 cc. water and dissolved by adding N/NaOH and making the pH of the solution more than 7.0, the pH is adjusted to 6.8 again by N/HCl and the same quantity of chloroform is added, so that a small quantity of chlorophyll and phenol moves to the layer of chloroform when the mixture is shaken.

Then a small quantity of chloroform is removed from the aqueous solution under decreased pressure, and the pH is adjusted to less than 4.0 with N/HCl. The compound of active substance and GL thus precipitated is washed again with HCl solution (pH less than 4.0) and dried in vacuum, and 1.6 gr. of the compound of active substance and GL is obtained. In this case, the ratio of active substance to GL is about 1:1.

*Example 3*

Water is added to 100 gram fresh Chlorella obtained in a similar way as described in Example 1 so that the total volume is 1,000 ml. The pH of said liquid is maintained at more than 8.0 with ammonia, heated at 60° C. for 15 minutes and cooled, then subjected to centrifugal separation. The pH of the thus extracted solution is adjusted to less than 4.0 with $N/H_2SO_4$ and heated, the flocculent precipitate is removed by centrifuge. Then the compound of the active substance and GL is precipitated, when a proper quantity of GL–Na solution is added to the clear top liquid.

After this precipitate is dissolved with N/NaOH, the precipitate is formed by keeping the pH of solution at 4.0 with N/HCl. Absolute ethanol is added to this precipitate and the concentration of ethanol adjusted to 90% so as to remove GL, and next after shaking the alcoholic layer is rejected. 100 ml. water is added to the residue and dissolve it by making the pH basic, then the pH is adjusted to neutral and the same quantity of chloroform is added. Then the gel which is formed at an intermediate layer is repeatedly taken, and chloroform is removed from this gel and 600 grams of active substance are obtained.

*Example 4*

A bamboo shoot which grew to 15 cm. tall is taken. 100 grams of the peeled bamboo shoot are crushed in a mortar and water is added so that the total volume is 1,000 ml. After adjusting the pH of the liquid to 7.0 with N/NaOH, the liquid is boiled at 100° C. for 10 minutes and is water cooled, and separated into supernatant liquid and precipitate by centrifuge. Then after applying a similar process as described in Example 1–4 to the top liquid, 180 mg. of active substance is obtained.

*Example 5*

After destroying the cell walls of fresh Chlorella by physical-chemical means such as freezing, boiling or exposing the algae to ultrasonic, it is extracted with aqueous solution (of which pH is controlled to less than 4.0 with mineral acids or organic acids).

Then by applying any process of the foregoing examples, the active substance is obtained.

*Example 6*

The cell walls of Chlorella are destroyed by any physical-chemical means, in this case by any optimal pH is chosen. Then dilute alcohol (usually less than 50%) or pyridine is added to the Chlorella whose cell walls is destroyed so that the total volume may be 10 times as much.

After extraction, the solvent is purged and pH of the aqueous solution is adjusted to 4.0, applied any process of the foregoing examples.

*Example 7*

Algae is made to continuously pass through a heating pipe without use of centrifugal precipitation, when the concentration of the culture pond of Chlorellascenedesmus is best.

During the passage the destruction of algae is promoted, and after cooling the residue of algae is removed by filtration, centrifugal precipitation or other means, then any process of the foregoing examples is applied. This is effective as an industrial process, in which treatment is continuous from the culture pond, omitting a process of taking out Chlorella from the pond.

I claim:

1. The method which comprises destroying the cell walls of a plant material selected from the group consisting of Chlorella, lotus seeds and bamboo shoots and extracting said plant material with water, thereby forming an aqueous extract thereof; acidifying the thus formed aqueous extract to a pH value of below about 4.5; and adding to the thus acidified aqueous extract a water-soluble salt of glycyrrhizinic acid so as to form a precipitate including glycyrrhizinic acid and a substance which gives a positive sedimentation reaction and a positive reaction to the dyeing effect of protein reagent, the ninhydrin dyed image of said substance on paper electrophoresis being closer to the cathode than is lysine, and the maximum absorption thereof under ultraviolet being at about 259 m$\mu$.

2. The method which comprises destroying the cell walls of a plant material selected from the group consisting of Chlorella, lotus seeds and bamboo shoots and extracting said plant material with water, thereby forming an aqueous extract thereof; acidifying the thus formed aqueous extract to a pH value of below about 4.5; adding to the thus acidified aqueous extract a water-soluble salt of glycyrrhizinic acid so as to form a precipitate including glycyrrhizinic acid and a substance which gives a positive sedimentation reaction and a positive reaction to the dyeing effect of protein reagent, the ninhydrin dyed image of said substance on paper electrophoresis being closer to the cathode than is lysine, and the maximum absorption thereof under ultraviolet being at about 259 m$\mu$; and separating said substance from said glycyrrhizinic acid.

3. Method according to claim 2 wherein said substance is seperated from the glycyrrhizinic acid by treatment with 85–95% alcohol.

4. Method according to claim 1 wherein the cell walls of said plant material are destroyed by boiling with water.

5. Method according to claim 1 wherein the cell walls are destroyed by freezing.

6. Method according to claim 1 wherein said plant material is Chlorella.

7. Substance produced by the method of claim 2.

8. Method according to claim 1 wherein said water-soluble salt of glycyrrhizinic acid is selected from the group consisting of sodium, potassium, calcium and ammonium salts thereof.

References Cited by the Examiner

Algal Culture (1953), Burlew, pages 311–315, Carnegie Institution of Wash., Publication 600, Washington, D.C.

ALBERT T. MEYERS, *Primary Examiner.*

JULIAN S. LEVITT, SAM ROSEN, *Examiners.*

LEROY B. RANDALL, MARTIN J. COHEN,
*Assistant Examiners.*